United States Patent [19]

Derks

[11] Patent Number: 4,887,093

[45] Date of Patent: Dec. 12, 1989

[54] MULTI-NOZZLE INK JET PRINTER

[75] Inventor: Paul A. H. Derks, Venlo, Netherlands

[73] Assignee: OCE-Nederland B.V., Venlo, Netherlands

[21] Appl. No.: 79,249

[22] Filed: Jul. 29, 1987

[30] Foreign Application Priority Data

Aug. 6, 1986 [EP] European Pat. Off. ........ 86201379.4

[51] Int. Cl.⁴ .......................... G01D 15/18; E03B 5/00

[52] U.S. Cl. ................................ 346/75; 346/140 A; 346/140 R; 137/567

[58] Field of Search ................. 346/75, 140 R, 140 A; 137/566, 567, 568; 417/44, 429

[56] References Cited

U.S. PATENT DOCUMENTS

| | | | |
|---|---|---|---|
| 4,252,508 | 2/1981 | Forster | 417/429 |
| 4,339,761 | 7/1982 | Matsunoto et al. | 346/75 |
| 4,413,267 | 1/1983 | Hein | 346/75 |

*Primary Examiner*—Clifford C. Shaw
*Assistant Examiner*—Gerald E. Preston
*Attorney, Agent, or Firm*—Reed Smith Shaw & McClay

[57] ABSTRACT

A multi-nozzle ink jet printer having an ink liquid supply system which is made up of a plurality of constant flow rate pumps. Each individual nozzle of the printer is connected to an associated pump. The pumps may be coupled to a common actuating mechanism such as a cam so that the flow rates of ink liquid through the different nozzles are kept at equal values irrespective of differences in the effective cross section of the nozzles.

7 Claims, 2 Drawing Sheets

MULTI-NOZZLE INK JET PRINTER

FIELD OF THE INVENTION

The present invention relates to an ink jet printer having a plurality of printing nozzles.

BACKGROUND OF THE INVENTION

An ink jet printer generally comprises at least one nozzle and an ink liquid supply system which supplies ink liquid to the nozzles at an appropriate pressure so that a jet of ink liquid is ejected onto a recording medium such as a sheet of paper. An ultrasonic transducer is usually provided for generating ultrasonic waves in the ink liquid to assist the separation of the ink jet into a sequence of equal-sized droplets. In a typical ink jet printing system, the droplets are electrically charged by passing the drops through a ring electrode and thereafter, through a pair of deflection plates. The charged droplets are selectively deflected in response to a voltage applied to the deflection plates, so that the droplets either impinge on the sheet of paper or are deflected to a beam gutter. The ink collected by the beam gutter may be recirculated to the supply system.

U.S. Pat. No. 4,135,197 discloses an ink jet printing device having a printing head which comprises a plurality of printing nozzles. The printing head includes an elongated chamber serving as an ink reservoir. One of the walls of the chamber is formed by an orifice plate which contains the nozzle orifices. An ink supply system is adapted to supply ink to the reservoir and to maintain a constant pressure in the reservoir so that the ink is distributed equally to the different orifices.

The ink jet printing system so disclosed has the advantages of a large number of ink jets that can be generated simultaneously so that the printing speed can be considerably increased. However, a reliability problem is encountered when the nozzles become clogged, for example, with dried ink. If the nozzles are partly clogged, deviations in the effective cross sections of the nozzles result in nonuniform flow rates of ink liquid through the different nozzles. This results in an impairment of the quality of the printed image.

In connection with single-nozzle ink jet printers. U.S. Pat. No. 4,263,602 discloses an ink liquid supply system which employs a constant flow rate pump. However, even if such a constant flow rate pump were employed in a multi-nozzle system such as that described in U.S. Pat. No. 4,135,197, the tendency of the nozzles to become clogged would not be eliminated and the reliability of the system would continue to be poor.

Accordingly, it is an object of the present invention to provide a multi-nozzle ink jet printer which has an improved reliability.

SUMMARY OF THE INVENTION

Generally, the invention comprises an ink liquid supply system having a plurality of constant flow rate pumps which are associated with each of the individual printing nozzles. Thus, if one of the nozzle becomes choked due to the deposition of dried ink or contaminants contained in the liquid, the pressure of the liquid supplied by the pump associated with that particular nozzle is increased so that the flow rate is forcibly maintained at a value which equals the flow rate through the other nozzles. As the flow velocity of the ink liquid increases in proportion with the pressure, the material deposited in the nozzle orifice is removed so that the tendency of the nozzle to become clogged is considerably reduced. If, however, a nozzle does become clogged, the pressure of the ink liquid will rise until the clog is forcibly removed.

Since the flow rate is substantially independent of the cross section of the nozzle, the invention has the additional advantage that the manufacturing tolerances of the nozzles are less critical.

Preferably, the constant flow rate pumps have an identical construction and are coupled to a common drive mechanism. The pumps may be mounted on a printing head of the printer and may be arranged directly adjacent to the associated nozzles. In such case, the overall volume of ink supply lines is reduced so that the consumption of maintenance solution for scavenging the nozzles and the supply system during inoperative periods of the printer is minimized.

In a presently preferred embodiment the flexibility of the system can be enhanced and the maintenance and repair facilitated. In that embodiment a modular construction is used so that each pump is integrated in a nozzle unit which is detachably mounted on the printing head. Each pump comprises the nozzle and associated devices such as an ultrasonic transducer, deflection plates, a beam gutter and the like. Other advantages of the present invention will become apparent from a perusal of a preferred embodiment taken in conjunction with the accompanying drawings.

PRESENTLY PREFERRED EMBODIMENT

Figure 1:
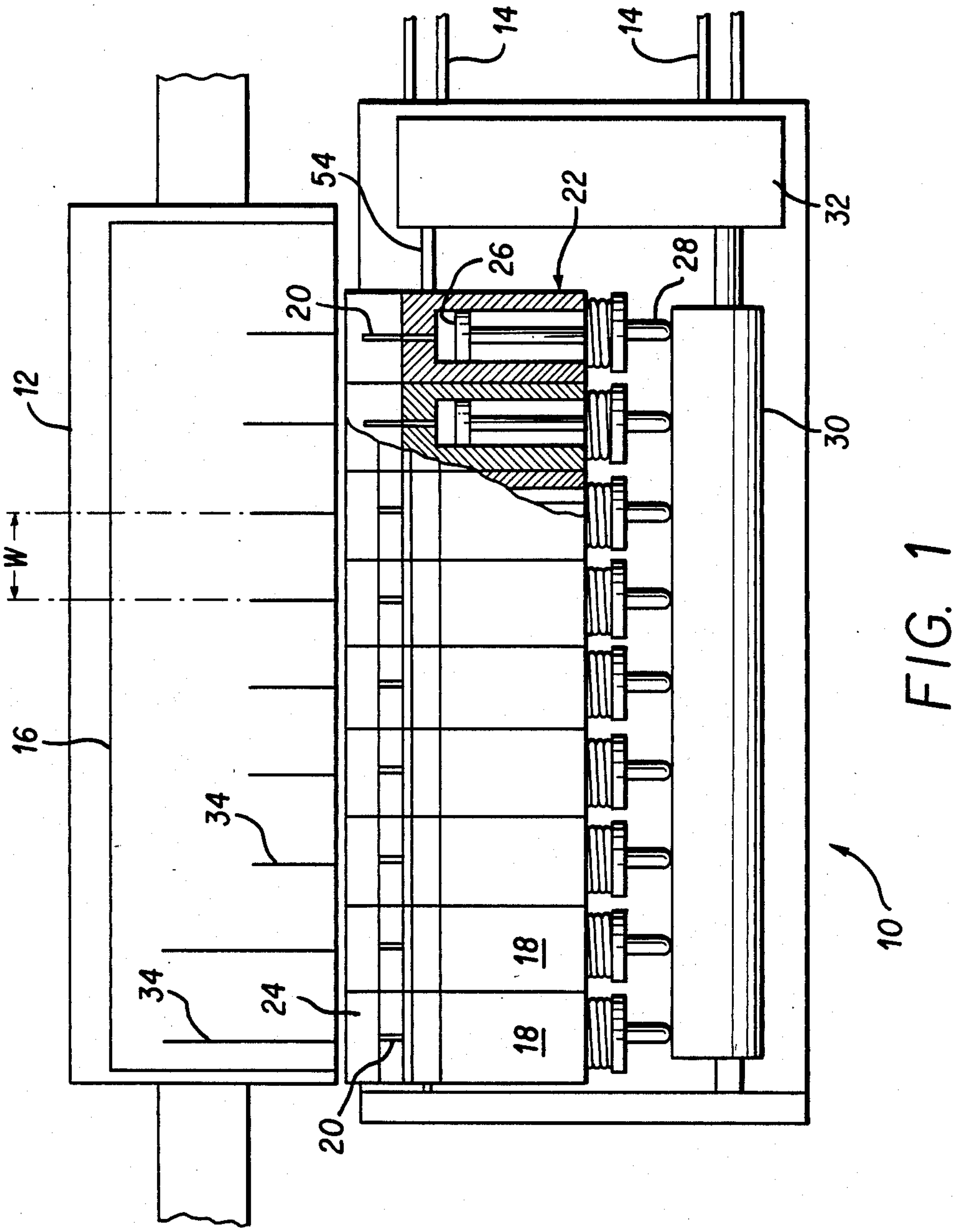
FIG. 1 is a plan view of a printing head of a multi-nozzle ink jet printer.

Referring to FIG. 1, printing head 10 is arranged adjacent to a platen 12 which supports a sheet of paper 16 on which the printed image is to be formed. Printing head 10 is mounted on guide rails 14 and is movable in longitudinal direction of platen 12.

A plurality of nozzle units 18 are mounted side by side on printing head 10. Each nozzle unit 18 comprises a nozzle 20 which has its tip directed towards platen 12 and is adapted to eject a beam of ink droplets onto paper sheet 16. The tip of each nozzle 20 is received in a beam deflection and gutter unit 24 which is not shown in detail in the drawings. Each nozzle unit 18 further comprises an ink liquid supply pump 22 having piston 26 which is reciprocable in the longitudinal direction of the nozzle 20. Each piston 26 includes piston rod 28 which is elastically biased towards a common cam 30 which extends past the rear ends of the nozzle units 18. A drive unit 32 rotates cam 30 so that pistons 26 of all pumps 22 are actuated synchronously.

Although not shown in the drawings, printing head 10 includes conventional tanks and supply lines for supplying ink liquid and maintenance solution to pumps 22. Additionally, an electronic control system for controlling the operation of the beam deflection means in response to input printing data is provided. The control system can be the same as used in the conventional multi-nozzle systems.

When the platen 12 is rotated while printing head 10 is held stationary, each nozzle 20 can print a line 34 on sheet 16. When platen 12 has accomplished one turn, printing head 10 is incrementally shifted along guide rails 14 and another line is printed immediately adjacent to first line 34. In case of single-color printing, the printing operation is completed as soon as a predetermined number of turns of the platen 12 have been achieved. The total shift of printing head 10 corresponds to the distance W between nozzles 20. As shown, the structure permits the arrangement of nozzles 20 at comparatively small intervals, so that a high printing speed can be achieved even if the resolution and, hence, the line density of the printed image is very high.

The system shown in FIG. 1 also lends itself for multi-color printing. If the printing units are operated with ink of different colors and if the range of travel of printing head 10 is increased in accordance with the number of colors, multi-color printing cam be easily accomplished.

Figure 2:
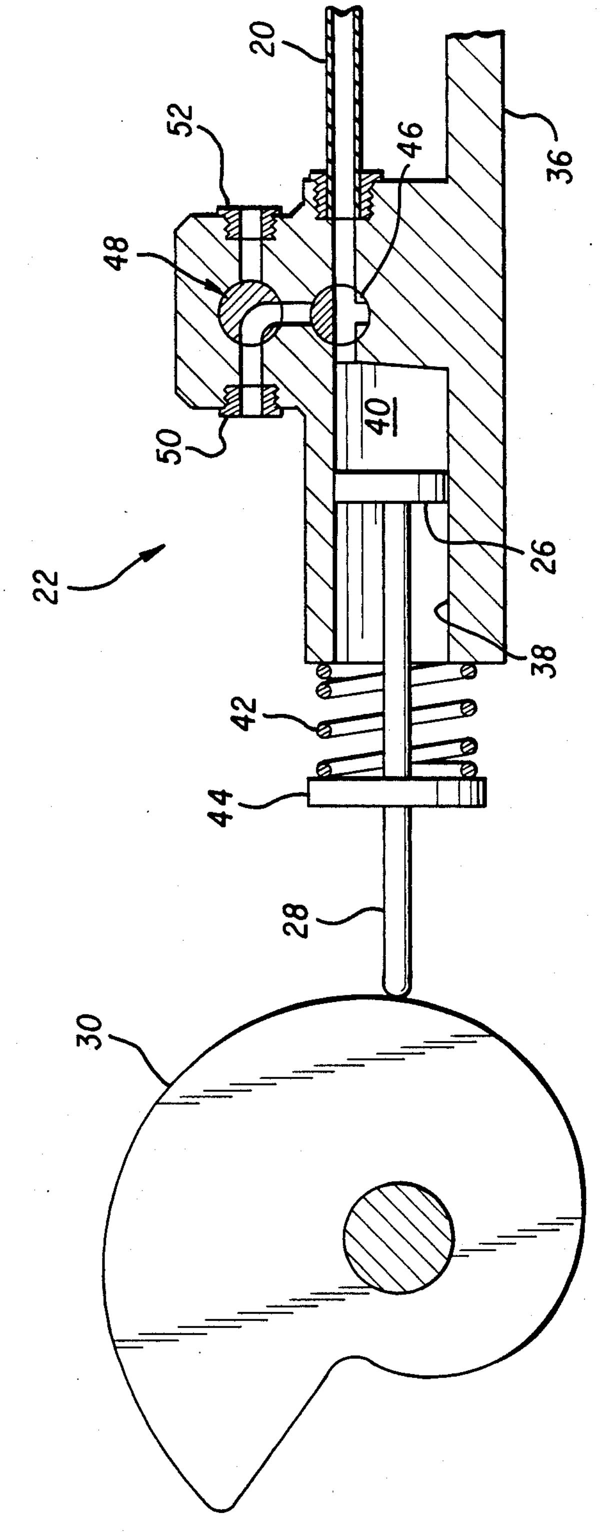
FIG. 2 is a sectional view of an ink liquid supply system for one nozzle of the ink jet printer.

With reference to FIG. 2, ink supply pump 22 of an individual nozzle unit 18 is shown. Pump 22 is incorporated in nozzle carrier 36 on which all members of the nozzle unit 18 are mounted. Piston 26 is slidably positioned in bore 38 of the nozzle carrier 36 to define pressure chamber 40. Piston rod 28 is biased towards cam 30 by means of helical compression spring 42 which is interposed between the rear end of nozzle carrier 36 and spring seat 44 formed on piston rod 28.

Pressure chamber 40 is fluidly connected to tubular nozzle 20 via three-way cock 46. By turning the plug of cock 46, pressure chamber 40 can be disconnected from its associated nozzle 20 and connected either to an inlet port 50 for ink liquid or to an inlet port 52 for maintenance solution via another three-way cock 48. Inlet ports 50 and 52 communicate with the ink reservoir and the maintenance solution tank, respectively, via supply lines which are not shown. The plugs of cock 46 and 48 are rotated by means of actuating shafts 54 (FIG. 1). The actuating shafts extend through all nozzle units 18 so that the respective cocks of the nozzle units are operated synchronously.

FIG. 2 shows the condition of supply pump 22 during a printing operation. Cam 30 is rotated clockwise, so that piston 26 moves to the right in FIG. 2 to compress spring 42. The ink liquid contained in pressure chamber 40 is forced into nozzle 20 at a constant flow rate. As pistons 26 of all nozzle units 18 are synchronously actuated by common cam 30, the flow rates of ink liquid through the different nozzles are equal, irrespective of differences in the nozzle cross section caused by contamination or manufacturing tolerances. The normal operating pressure in pressure chamber 40 is preferably between about 30 to 40 bar. If, however, a nozzle 20 is clogged, the pressure in the corresponding pressure chamber may rise to, for instance, 600 bars, because the force exerted by cam 30 then concentrates on the piston associated with the clogged nozzle. As a result, there is generated a sufficiently high pressure for removing the clog.

The dimension of pressure chamber 40 and the stroke of piston 26 are selected in such a manner that the amount of ink which can be delivered during one stroke is sufficient for a complete printing process.

At the end of the compression stroke of piston 26, the plug of cock 46 is actuated so that pressure chamber 40 is disconnected from nozzle 20 and connected to inlet port 50. During the subsequent suction stroke of piston 26, that is, piston 26 moves in direction to the left by action of spring 42, another charge of ink liquid is sucked into pressure chamber 40. Then, cock 46 is returned to the position shown in FIG. 2 so that another printing operating may be started as soon as sheet 16 on platen 12 has been replaced by a new one.

The purpose of disconnecting pressure chamber 40 from nozzle 20 during the suction stroke is to prevent ambient air from being sucked into nozzle 20 such air causes the ink contained in the nozzle to dry out and clog the nozzles.

If necessary, the ink supply system can be easily scavenged with maintenance solution. To this end, cock 48 is actuated to disconnect suction chamber 40 from inlet port 50 and connect it to inlet port 52 so that maintenance solution can be sucked into chamber 40 during the suction stroke. The maintenance solution can be forced through the nozzle 20 with a high pressure to efficiently remove any contaminants deposited in the nozzle.

While the apparatus described above constitutes a preferred embodiment of this invention, it is to be understood that the invention is not limited to this precise form of apparatus shown, and that changes may be made therein without departing from the scope of the invention. For instance, nozzle units 28 may be arranged in a number of parallel rows. Furthermore, the housing of the ink supply pump need not be formed integrally with the nozzle carrier. Instead, a commercially available pump, such as a pump presently used for high pressure liquid chromatography applications may be mounted on the nozzle carrier. Accordingly, the invention may be otherwise embodied within the scope of the appended claims.

What is claimed is:

1. An ink jet printer comprising a plurality of printing nozzles and an ink liquid supply system, said ink liquid supply system including a plurality of constant flow rate pumps, the number of said pumps being equal to the number of printing nozzles each of said pumps comprising a cylinder and a reciprocating piston which defines a pressure chamber within said cylinder, said plurality of cylinders being arranged side by side directly adjacent to the upstream ends of the associated nozzles, and each of said nozzles being connected to an associated one of said pumps by means of a fluid passageway.

2. An ink jet printer as claimed in claim 1, wherein said pumps are coupled to a common drive mechanism.

3. An ink jet printer as claimed in claim 1, wherein said common drive mechanism comprises an actuating cam.

4. An ink jet printer as claimed in claim 3, wherein the cylinders of said pumps are arranged in a row and wherein said pistons have piston rods which are engaged with said common actuating cam.

5. An ink jet printer as claimed in claims 3 or 5, wherein each pump has valve means for selectively communicating said pressure chamber with its associated nozzle, an inlet port for ink liquid or an inlet port for maintenance solution.

6. An ink jet printer as claimed in claim 5, wherein said valve means of each of said pumps is actuated by a common actuating shaft.

7. An ink jet printer as claimed in claims 1, 2, 3 or 4, wherein each pump and its associated nozzle form part of a nozzle unit which is detachably mounted on a printing head.

* * * * *